US010427199B2

(12) United States Patent
Forte et al.

(10) Patent No.: US 10,427,199 B2
(45) Date of Patent: Oct. 1, 2019

(54) METHOD OF FORMING A TRAILER HITCH RECEIVER TUBE

(71) Applicant: Jefferson Metal Products, Inc., Windsor, Ontario (CA)

(72) Inventors: Mario Forte, Windsor (CA); Jon Ryan Forte, Windsor (CA)

(73) Assignee: Jefferson Metal Products, Inc., Windsor, Ontario (CA)

( * ) Notice: Subject to any disclaimer, the term of this patent is extended or adjusted under 35 U.S.C. 154(b) by 6 days.

(21) Appl. No.: 15/582,035

(22) Filed: Apr. 28, 2017

(65) Prior Publication Data
US 2017/0312801 A1    Nov. 2, 2017

(30) Foreign Application Priority Data
Apr. 29, 2016 (CA) ..................... 2928490

(51) Int. Cl.
*B21D 19/14* (2006.01)
*B21D 53/88* (2006.01)
(Continued)

(52) U.S. Cl.
CPC .......... *B21D 19/14* (2013.01); *B21D 19/08* (2013.01); *B21D 53/88* (2013.01); *B21J 5/025* (2013.01); *B60D 1/01* (2013.01)

(58) Field of Classification Search
CPC .......... B21K 7/12; B21K 21/12; B21D 19/08; B21D 19/14; B21J 5/025; B21J 13/025
See application file for complete search history.

(56) References Cited

U.S. PATENT DOCUMENTS

| 1,966,053 A | 7/1934 | Squires |
| 5,203,194 A | 4/1993 | Marquardt |
(Continued)

FOREIGN PATENT DOCUMENTS

| CA | 2262777 | 8/2000 |
| CA | 2483113 | 8/2000 |

OTHER PUBLICATIONS

Official Action dated Oct. 4, 2017 regarding CA Appl. No. 2,928,490, 6 pages.
(Continued)

*Primary Examiner* — Debra M Sullivan
(74) *Attorney, Agent, or Firm* — Brinks Gilson & Lione; Stephen J. Leahu

(57) ABSTRACT

A method of manufacturing a trailer hitch receiver tube with an integral reinforcing collar is described. A two piece die having an interior shape and dimensions conforming to the shape and dimensions of a selected trailer hitch receiver tube is provided, the two pieces of the die being a right half and a left half. Each of the right and left halves of the die are provided with means to forcefully move the die from an open position to a closed position around a workpiece. The die, around an upper edge thereof is provided with a relief cavity around its perimeter having the shape of a reinforcement collar. A base mandrel is provided between the right and left halves of the die, the base mandrel having a size and shape conforming to the size and shape of the interior of a trailer hitch receiver tube, and the base mandrel having a height less than the die. A steel receiver tube is positioned on the base mandrel, the tube having a height greater than the die halves. The die halves are then closed forcefully against the receiver tube. A forming mandrel is provided above the receiver tube. The forming mandrel has a longitudinal portion that conforms in shape to the interior of the receiver tube, and a lateral, forming portion for bearing against the
(Continued)

upper edge of the receiver tube to form the upper portion of a receiver tube into a reinforcing collar by deforming the upper end of said tube into the relief cavity. An upper edge of the receiver tube is then forcefully struck with the forming portion of the forming mandrel, to form the collar, wherein the longitudinal portion of the forming mandrel closely approaches an upper surface of the base mandrel after the collar is formed.

2 Claims, 1 Drawing Sheet

(51) Int. Cl.
  *B21J 5/02* (2006.01)
  *B21D 19/08* (2006.01)
  *B60D 1/01* (2006.01)

(56) References Cited

U.S. PATENT DOCUMENTS

| | | |
|---|---|---|
| 6,408,672 B1 | 6/2002 | Roe et al. |
| 6,796,574 B2 | 9/2004 | Palmer |
| 6,820,890 B2 | 11/2004 | Westerdale |
| 7,052,778 B2 | 5/2006 | Sorgi |
| 7,412,864 B2 | 8/2008 | Jones |
| 2005/0005667 A1 | 1/2005 | Greczanik et al. |
| 2015/0042072 A1 | 2/2015 | Kelly |

OTHER PUBLICATIONS

Official Action dated Dec. 4, 2017 regarding CA Appl. No. 2,928,490, 3 pages.

METHOD OF FORMING A TRAILER HITCH RECEIVER TUBE

CROSS REFERENCE TO RELATED APPLICATIONS

The present application claims benefit of priority thereto under 35 U.S.C. Section 119(a-d) to Canadian Application No. CA 2928490 filed Apr. 29, 2016, the disclosure of which is hereby incorporated herein by reference in its entirety.

FIELD OF THE INVENTION

The present invention relates to the field of metal forming. In particular, the present invention provides an improved method of forming a trailer hitch receiver tube.

BACKGROUND OF THE INVENTION

A receiver tube is a robust, rigid tube, made of steel or other suitable metal that is permanently or semi-permanently affixed to the rear of a vehicle. Its purpose is to accept a sleeve and ball trailer hitch, which is inserted into the receiver, and held there by a laterally extending pin that goes through both the receiver tube and the sleeve and ball hitch. A trailer can then be attached to the hitch.

In order to strengthen a receiver tube, it has, for years, been the practice to affix by welding, a reinforcement collar, made of steel, to the rearward projecting end of the receiver tube. Recently, however, receiver tubes have been designed with integral collars. A typical design of a receiver tube with an integral collar is shown in U.S. Pat. No. 6,408,672 to Roe. In that patent, a receiver tube with an integral collar is produced by inserting a steel tube into the open end of a die conforming to the outer profile of the tube. The die has a cavity shaped like a collar at its outer end, and stop means to prevent movement of the tube longitudinally in the die. The stop means comprises a rigid floor to the die, so that pressure on the tube at the open end of the die will not force the tube through the die. A T-shaped mandrel is then lowered into the tube, with the body of the mandrel conforming to the interior dimension of the tube to support same against collapse under pressure. When the head of the T-shaped mandrel contacts the end of the tube, high pressure is then applied by the mandrel, to deform the end of the tube into the collar shaped cavity. As the mandrel advances, it supports the walls of the tube from deforming. However, as the mandrel advances, the inner end of the tube is substantially unsupported at the moment the head of the mandrel contacts the end of tube. Therefore, in practice, when the method of U.S. Pat. No. 6,408,672 is carried out. Pressure is applied gradually, so that the inner end of the tube, which is supported on its outside, if not on its inside, surfaces, will tend not to buckle. With a faster impact to the outer end of a cold tube, there is a greater tendency for the impact to be absorbed along the entire length of the tube, and so to cause deformation of the partially supported inner end, as well as the unsupported outer end. It will be noted, in this regard, that this tendency is countered to some extent by the closed shape of the tube, which will tend to direct forces outwardly rather than inwardly. However, in this regard, the inner end of the tube may still deform under a high load.

BRIEF SUMMARY OF THE INVENTION

The present invention is an improvement over the process of U.S. Pat. No. 6,408,672. In the present invention, a different form of die is provided for a steel tube than is provided in U.S. Pat. No. 6,408,672. In the present invention, a two piece die is provided, with right and left sides that come together under pressure to hold a steel tube firmly in position against axial movement. When the die halves come together, they define a longitudinal space dimensioned to exactly hold a suitable steel tube, and are provided with a relief cavity at their upper end, whereby the end of the steel tube may be deformed into the relief cavity. Utilizing the two part mold as in the method of the present invention, prevents deformation anywhere other than the end of the tube that extends from the mold.

In the method of the present invention, the tube is inserted onto a stationary mandrel that extends upwardly from a solid surface. The mold halves may then be closed around the tube, using a T-shaped mandrel with an upper surface adopted to strike the end of the tube, and a length selected to almost meet the stationary mandrel when the end of the tube is fully deformed into the relief cavity. In this case, the only unsupported inner wall surface of the tube is the short length of wall between the two mandrels, the stationary mandrel and the T-shaped mandrel. This position of the steel tube is less likely to deform than the unsupported inner end of the tube in U.S. Pat. No. 6,408,672, because each end of this portion is integral with and therefore axially supported by the portions of the tube above and below it.

The result, using this arrangement, is a tube with a collar that may be formed faster than using the method of U.S. Pat. No. 6,408,672. Because the end of the tube does not need to be heated, the tube can be struck rather than gradually pressed. Moreover, a high degree of quality control is ensured, because the chance of deforming the other end of the tube is minimized.

In a broad aspect, moreover, the present invention provides a method of manufacturing a trailer hitch receiver tube with an integral reinforcing collar comprising the steps of: i) providing a two piece die having an interior shape and dimensions conforming to the shape and dimensions of a selected trailer hitch receiver tube, the two pieces of said die being a right half and a left half, each of said right and left halves of said die being provided with means to forcefully move said die from an open position to a closed position around a workpiece, said die, around an upper edge thereof being provided with a relief cavity around its perimeter having the shape of a reinforcement collar; ii) providing a base mandrel between said right and left halves of said die said base mandrel having a size and shape conforming to the size and shape of the interior of a said trailer hitch receiver tube, said base mandrel having a height less than said die; iii) positioning a steel receiver tube on said base mandrel, said tube having a height greater than said die halves; iv) closing said die halves forcefully against said receiver tube; v) providing a forming mandrel above said receiver tube, said forming mandrel having a longitudinal portion that conforms in shape to the interior of a said receiver tube, and a lateral, forming portion for bearing against an upper edge of said receiver tube to form an upper portion of a said receiver tube into a reinforcing collar by deforming the upper portion of said tube into said relief cavity, and forcefully striking an upper edge of said receiver tube with the forming portion of said forming mandrel, to form said collar, wherein the longitudinal portion of said forming mandrel closely approaches an upper surface of said base mandrel after said collar is formed.

BRIEF DESCRIPTION OF THE DRAWINGS

In drawings that illustrate the present invention by way of example.

DETAILED DESCRIPTION OF THE INVENTION

Figure 1:
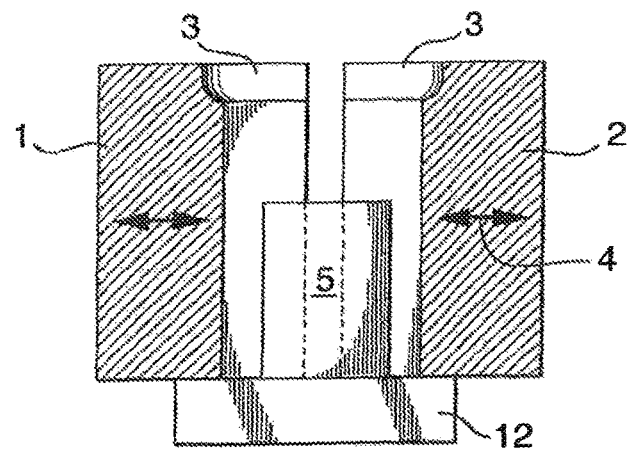
FIG. 1 is a side sectional view of a pair of dies in an open position over a base mandrel.
Figure 2:
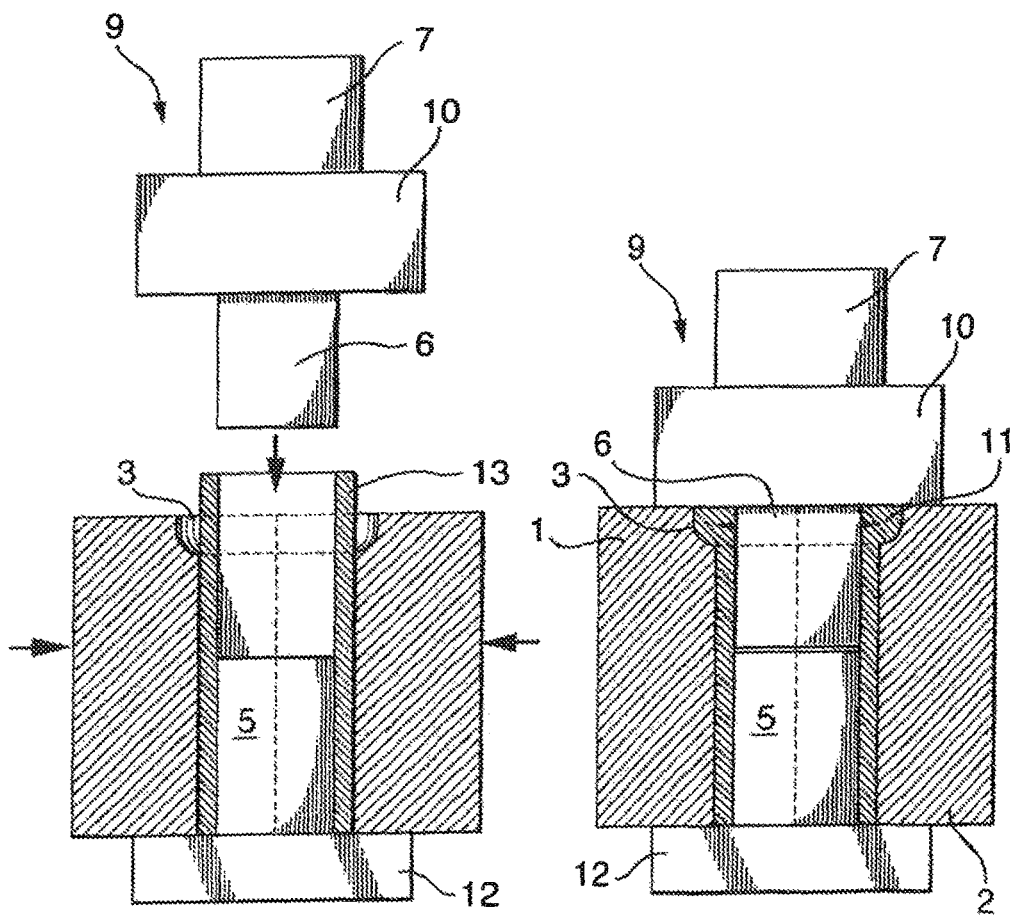
FIG. 2 is a side sectional view of the pair of dies of FIG. 1, closed on a steel tube, with a forming mandrel partly inserted into the tube.
Figure 3:
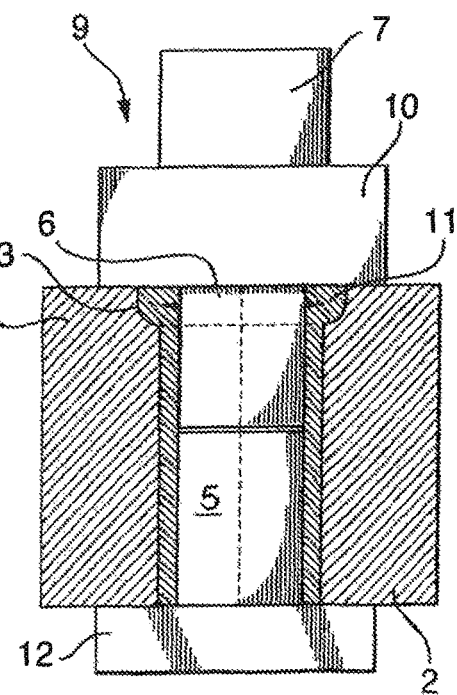
FIG. 3 is a view of the arrangement of FIG. 2, with the forming mandrel fully extended, having struck and deformed the end of the steel tube.

Referring first to FIGS. 1 to 3, in a first embodiment, a pair of mold halves 1, 2 is provided. Each is provided at its upper edge with a relief cavity 3 shaped to form a reinforcement collar for a trailer hitch receiver tube.

As shown by arrows 4, the mold halves 1, 2 are moveable laterally. A base mandrel 5 is provided on a base platform 12 between the two mold halves. Base mandrel 5 is dimensioned to accept a steel tube 13, so that a steel tube 13 may be positioned on base mandrel 5, and the mold halves 1 and 2 closed tightly on the tube 13. This will immobilize the steel tube 13 with a portion of the tube extending above the closed mold halves. It will be understood that the length of steel tube 13 extending above the closed mold halves will be a length selected so that its total volume is equal to, or slightly less than, the total volume of the relief cavities in the mold halves.

As shown in FIG. 3, a forming mandrel 9 is positioned above the mold halves, aligned with the base mandrel 5. The forming mandrel 9 comprises a ram 7 for powering the forming mandrel in a downward direction, a support mandrel 6 for insertion into the steel tube 13, and a forming portion 10 for striking the upper end of the steel tube to form a collar by deforming the upper end of the tube 13 into the relief cavity 3. As can be seen in FIG. 3, the length of the support mandrel 6 is such that at full extension of the forming mandrel 9, the support mandrel 6 is separated from base mandrel 5 by a very narrow gap, in the order of 1 mm. Forming mandrel 9 is then raised, the finished product is removed from the base mandrel 5, and the process can be repeated, as desired.

With the method of the present invention, in which the collar is formed by striking the end of the tube, rather than gradually pressing the end, the collar of the product as it emerges from the mold is in finished condition. That is, deformation of the tube end, and folding of the tube end into the relief cavity is complete, without the need for subsequent grinding. This is thought to be because, with the gradual transfer of kinetic energy from the forming mandrel to the workpiece in the method of the prior art, folding may not be complete, and therefore, some of the steel of the end of the tube may remain above the relief cavity, and need to be ground down. With the method of the present invention, wherein the end of the tube is struck, the kinetic energy of the forming mandrel is transferred to the end of the pipe in a much smaller space of time, resulting in increased plasticity in the steel, which leads to better folding of the steel into the relief cavity.

The result of the method of the present invention is therefore a high quality trailer hitch receiver tube, with an integrally formed reinforcement collar, that requires no further working.

The invention claimed is:

1. A method of manufacturing a trailer hitch receiver tube with an integral reinforcing collar comprising the steps of:
   i) providing a two piece die having an interior shape and dimensions conforming to a shape and dimensions of a selected trailer hitch receiver tube, the two pieces of said die being a right half and a left half, each of said right and left halves of said die being provided with means to forcefully move said die from an open position to a closed position around a workpiece, said die, around an upper edge thereof being provided with a relief cavity around the upper edge of each of its right and left halves having a shape of a reinforcement collar;
   ii) providing a base mandrel between said right and left halves of said die, said base mandrel having a size and shape conforming to a size and shape of an interior of said trailer hitch receiver tube, said base mandrel having a longitudinal height less than said die
   iii) positioning said trailer hitch receiver tube on said base mandrel, said trailer hitch receiver tube having a longitudinal height greater than said die halves;
   iv) closing said die halves forcefully against said trailer hitch receiver tube;
   v) providing a forming mandrel above said trailer hitch receiver tube, said forming mandrel having a longitudinal portion that conforms in shape to the interior of a said trailer hitch receiver tube, and a lateral, forming portion for bearing against an upper edge of said trailer hitch receiver tube to form an upper portion of said trailer hitch receiver tube into a reinforcing collar by deforming the upper end of said trailer hitch receiver tube into said relief cavity, and forcefully striking the upper edge of said trailer hitch receiver tube with the forming portion of said forming mandrel, to form said collar, wherein the longitudinal portion of said forming mandrel closely approaches an upper surface of said base mandrel after said collar is formed.

2. A method as claimed in claim 1, wherein said base mandrel is about half a longitudinal height of said die.

* * * * *